United States Patent [19]
Kanai

[11] Patent Number: 5,754,336
[45] Date of Patent: May 19, 1998

[54] OPTICAL SYSTEM FOR A REAL IMAGE TYPE VIEW FINDER

[75] Inventor: Moriyasu Kanai, Tokyo, Japan

[73] Assignee: Asahi Kogaku Kogyo Kabushiki Kaisha, Tokyo, Japan

[21] Appl. No.: 636,953

[22] Filed: Apr. 24, 1996

[30] Foreign Application Priority Data

Apr. 28, 1995 [JP] Japan ................................. 7-129208
Jun. 12, 1995 [JP] Japan ................................. 7-144484

[51] Int. Cl.$^6$ .................. G02B 23/14; G02B 5/04; G02B 17/08; G03B 13/02
[52] U.S. Cl. .................. 359/431; 359/834; 359/613; 396/834
[58] Field of Search .................. 359/431, 834, 359/836, 833, 613, 614; 396/834, 835

[56] References Cited

U.S. PATENT DOCUMENTS

| | | | |
|---|---|---|---|
| 3,601,477 | 8/1971 | Miyazaki | 359/834 |
| 3,952,321 | 4/1976 | Matui | 396/384 |
| 4,926,201 | 5/1990 | Mukai et al. | 396/384 |
| 5,323,264 | 6/1994 | Kato | 349/431 |
| 5,376,984 | 12/1994 | Abe . | |
| 5,565,950 | 10/1996 | Taguchi et al. | 396/379 |

FOREIGN PATENT DOCUMENTS 59-24802  2/1984  Japan ................................. 359/834

*Primary Examiner*—Jon W. Henry
*Attorney, Agent, or Firm*—Greenblum & Bernstein P.L.C.

[57] ABSTRACT

An optical system for a real image type view finder having an objective lens system and an ocular lens system, including a first deflector and a second deflector. The first deflector has a first reflection surface which reflects on-axis light, incident thereupon along an optical axis of the objective lens system, towards an optical axis of the ocular lens system. The second deflector has an incident surface upon which light, reflected by the first deflector, is made incident, and second and third reflection surface to internally reflect that light incident upon the incident surface, before emitting the light through an exit surface toward the ocular lens system. The on-axis light incident upon the first deflector and the light reflected by the first deflector defines an acute angle therebetween. The second deflector satisfies the following relationships:

$$90° < \theta < 120°$$

$$90° < \psi < 120°$$

wherein "$\theta$" represents an angle defined between the incident surface and the exit surface of the second deflector, and "$\psi$" represents an angle defined between the second reflection surface and the exit surface of the second deflector.

14 Claims, 5 Drawing Sheets

OPTICAL SYSTEM FOR A REAL IMAGE TYPE VIEW FINDER

BACKGROUND OF THE INVENTION

1. Field of the Invention

The present invention relates to an optical system for a real image type view finder.

2. Description of the Related Art

In a known real image type view finder, as shown in FIG. 9, light reflected by an object (not shown) passes through an objective lens system 1 to be reflected by a roof mirror 2, in a direction away from the optical axis of the objective lens system 1, and passes through a diaphragm 3 before reaching a pentagonal prism 4. The light incident upon an incident surface 4a of the pentagonal prism 4 is internally reflected by first and second reflection surfaces 4b, 4c before being emitted from an exit surface 4d, along the direction of an optical axis Ax towards an eyepiece (ocular) system 5.

The roof mirror 2 comprises two orthogonal mirror surfaces which invert an object image, formed by the objective lens system 1, in the vertical and horizontal directions. The on-axis light, i.e., that light incident along the optical axis of the objective lens system 1, is reflected at right angles by the roof mirror 2.

The incident surface 4a and the first reflection surface 4b of the pentagonal prism 4 are respectively inclined at angles of 90° and 112.5° with respect to the exit surface 4d, within a reference plane that includes the optical axes of the objective lens system 1 and the eyepiece system 5.

If the diameter of the bundle of rays of light is relatively large, in comparison with the size of the pentagonal prism 4, part of the light reflected by the second reflection surface 4c is reflected by the incident surface 4a, so that extraneous light, or noise, (ghost image) G is emitted through the exit surface 4d of the pentagonal prism 4, as indicated by a dotted line in FIG. 10.

If the angle defined between the incident surface 4a and the exit surface 4d is 90°, as in a conventional real image type view finder, the extraneous light G is emitted from the exit surface 4d at approximately 90° (with respect to the exit surface 4d), and reaches a viewer's eye through the eyepiece system 5 as a ghost image.

It is possible to prevent a ghost image from occurring by increasing the size of the pentagonal prism relative to the diameter of the bundle of rays of light. However, this increases the size of the view finder as a whole, contrary to a realization of a compact camera.

FIG. 11 shows an example of a known pentagonal prism 151. In the pentagonal prism 151, light incident upon a first transmission surface 153 is reflected by first and second reflection surfaces 155, 157 before being emitted through a second transmission surface 159. The effective width a1 of the first transmission surface 153 is restricted by the second transmission surface 159 and the second reflection surface 157, and the effective width b1 of the second transmission surface 159 is restricted by the first transmission surface 153 and the first reflection surface 155. Consequently, it is necessary to make the prism large as a whole in order to increase the effective widths a1 and b1, contrary to a realization of a compact camera.

SUMMARY OF THE INVENTION

It is an object of the present invention to provide an optical system for a real image type view finder, in which no ghost image in the view finder reaches a viewer's eye even if a small pentagonal prism, relative to the diameter of the bundle of rays of light, is used.

Another object of the present invention is to provide a prism having an increased effective optical path width.

According to an aspect of the present invention, there is provided an optical system for a real image type view finder having an objective lens system and an ocular lens system, including a first deflector and a second deflector. The first deflector has a first reflection surface to reflect on-axis light, incident thereupon along an optical axis of the objective lens system, towards an optical axis of the ocular lens system. The second deflector has an incident surface upon which the light reflected by the first deflector is made incident. Second and third reflection surfaces are provided to internally reflect the light incident upon and passing through the incident surface. An exit surface is also provided through which the light is emitted towards the ocular lens system. The on-axis light incident upon the first deflector and the light reflected by the first deflector define an acute angle therebetween. The second deflector satisfies the following relationships:

$$90° < \theta < 120°$$

$$90° < \psi < 120°$$

wherein "$\theta$" represents an angle defined between the incident surface and the exit surface of the second deflector, and "$\psi$" represents an angle defined between the second reflection surface and the exit surface of the second deflector.

Preferably, the incident surface of the second deflector is perpendicular to the on-axis light incident upon the second deflector, and the exit surface is perpendicular to the optical axis of the ocular lens system.

It is preferred that the first deflector is either a roof prism or a roof mirror having a first reflection surface formed by a roof surface to invert an object image in vertical and horizontal directions. A pentagonal prism or a pentagonal roof prism can be used as the second deflector. If a pentagonal roof prism is used one of the second or third reflection surfaces of the prism is a roof surface which inverts an object image in vertical and horizontal directions.

Preferably, the prism has a refractive index of more than or equal to 1.7.

The optical axis of the ocular lens system is preferably parallel to and spaced from the optical axis of the objective lens system.

According to another aspect of the present invention, a prism is provided having a transmission surface and a reflection surface adjacent thereto. The reflection surface is provided, on a portion thereof close to the transmission surface, with a projection which provides an extension for the transmission surface.

In a further aspect of the present invention, a prism is provided having first and second transmission surfaces adjacent to each other. First and second reflection surfaces are provided respectively adjacent to the second and first transmission surfaces. The first and second reflection surfaces are provided, on portions thereof contiguous to the second and first transmission surfaces, with projections which respectively extend the second and first transmission surfaces.

Preferably, the prism is a pentagonal prism.

An angle defined between the first and second transmission surfaces is preferably greater than 90°.

The prism preferably satisfies the following relationships:

$$\phi > 90°$$

ψ>90° wherein "φ" represents an angle defined between the second transmission surface and the first reflection surface, and "ψ" represents an angle defined between the first transmission surface and the second reflection surface.

In a further aspect of the present invention, an optical system for a real image type view finder is provided including an objective lens system, an ocular lens system and a deflector. The deflector has an incident surface upon which light passing through the objective lens system is made incident, and first and second reflection surfaces which internally reflect the incident light, before emitting it through an exit surface towards the ocular lens system. The deflector satisfies the following relationships:

90°<θ<120°

90°<ψ<120° wherein "θ" represents an angle defined between the incident and exit surfaces of the deflector, and "ψ" represents an angle defined between the first reflection surface and the exit surface of the deflector.

According to another aspect of the present invention, there is provided an optical system for a real image type view finder comprising an objective lens system, an ocular lens system whose optical axis is spaced in parallel from the optical axis of the objective lens system, a first deflector having a first reflection surface which reflects light incident thereupon through the objective lens system towards the optical axis of the ocular lens system, and a second deflector in the form of a prism having an incident surface upon which the light deflected by the first deflector is made incident and second and third reflection surfaces which internally reflect the light incident upon the second deflector through the incident surface thereof towards the ocular lens system through an exit surface of the second deflector, wherein the first deflector is designed such that the on-axis light incident thereupon along the optical axis of the objective lens system and the light reflected by the first deflector defines an acute angle therebetween, and wherein the second deflector satisfies the following relationship in a reference plane including the optical axes of the objective lens system and the ocular lens system,

90°<θ<120°

90°<ψ<120° wherein "θ" designates the angle defined between the incident surface and the exit surface, of the second deflector, and "ψ" designates the angle defined between the second reflection surface and the exit surface, of the second deflector, respectively.

The present disclosure relates to subject matter contained in Japanese patent application Nos. 07-129208 (filed on Apr. 28, 1995) and 07-144484 (filed on Jun. 12, 1995) which are expressly incorporated herein by reference in their entireties.

BRIEF DESCRIPTION OF THE DRAWINGS

The invention will be described below in detail hereinafter with specific reference to the accompanying drawings, in which like reference numerals are used to represent similar parts, and wherein.

DESCRIPTION OF THE PREFERRED EMBODIMENT

Figure 1:
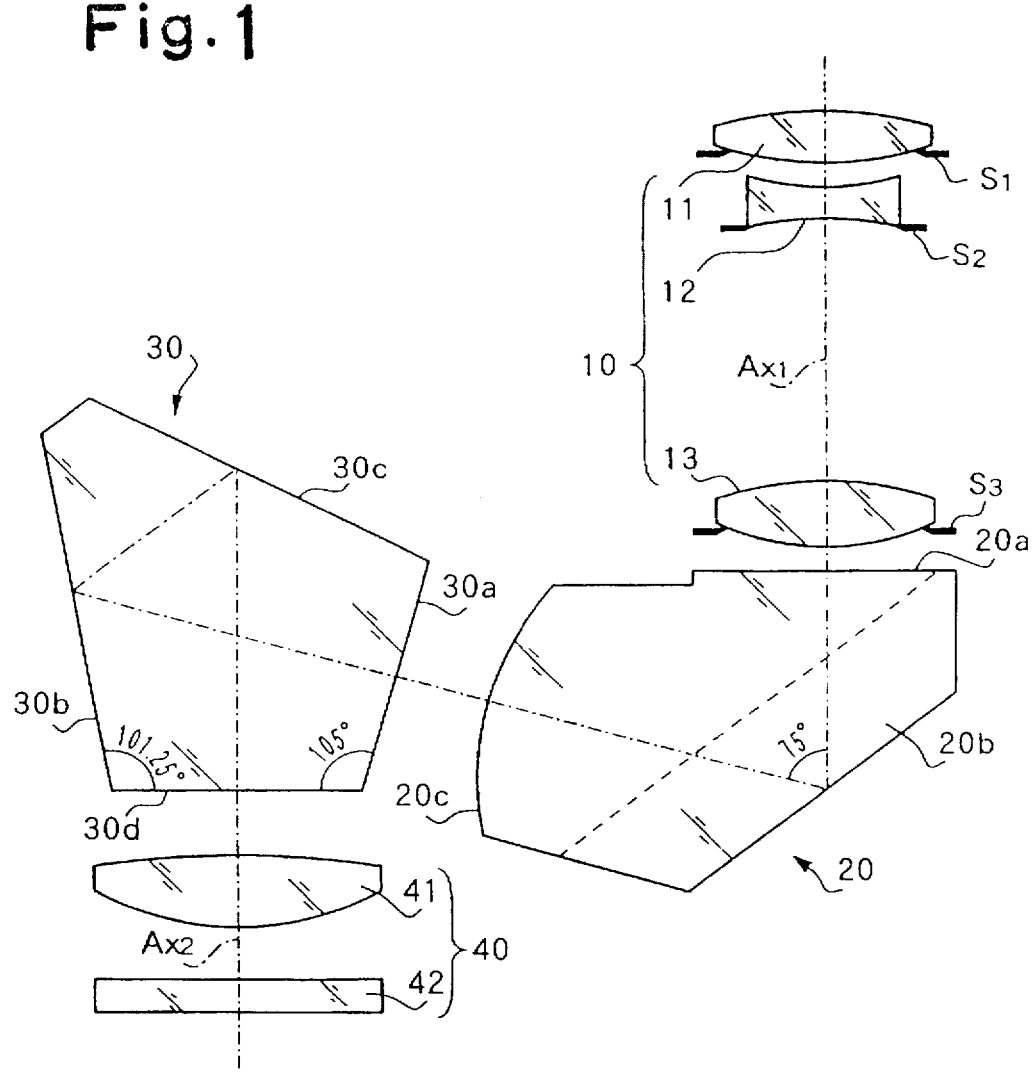
FIG. 1 is a plan view of an optical system for a real image type view finder within a plane including the optical axis thereof, according to a first embodiment of the present invention.
Figure 2:
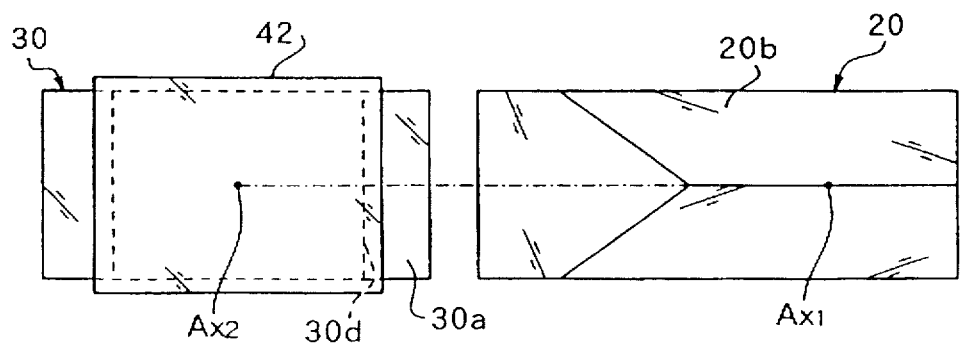
FIG. 2 is a front elevational view of the optical system shown in FIG. 1.

FIGS. 1 and 2 show an optical system for a real image type view finder, according to a first embodiment of the present invention. The optical system comprises an objective lens system 10 having an optical axis Ax1, a roof prism 20 which constitutes a first deflector, a pentagonal prism 30 which constitutes a second deflector, and an eyepiece (ocular lens) system 40 having an optical axis Ax2, in the order in which light, of an object to be viewed, passes. The optical axis Ax2 is parallel to and spaced apart from the optical axis Ax1 of the objective lens system 10.

The objective lens system 10 is comprises a first lens 11, a second lens 12, and a third lens 13, in this order from the object side, so that the magnification of an image of the object can be varied by changing the distance between the second lens 12 and the third lens 13. A primary image, formed by the objective lens system 10, is converged in the vicinity of an incident surface 30a of the pentagonal prism 30. Diaphragms S1, S2 and S3 are positioned on the image side of the respective lenses (11, 12, 13) of the objective lens system 10.

A first reflection surface (roof surface) 20b of the roof prism 20 reflects light incident thereupon through the objective lens system 10, towards the optical axis Ax2 of the eyepiece system 40. The roof prism 20 is designed such that on-axis light incident thereupon along the optical axis Ax1 of the objective lens system 10 and light reflected therefrom defines an acute angle. In the illustrated embodiment, this angle is 75°. An exit surface 20c of the roof prism 20 is made of a convex surface which functions as a condenser lens.

The pentagonal prism 30 internally reflects that light deflected by the roof prism 20 and incident upon the pentagonal prism 30 by reflection surfaces 30b and 30c (second and third reflection surfaces), before it is emitted through an exit surface 30d toward the eyepiece system 40. The incident surface 30a and the exit surface 30d of the pentagonal prism 30 are respectively perpendicular to the on-axis light and the optical axis Ax2 of the eyepiece system 40. It should be noted that either one of the reflection surfaces 30b or 30c can be a roof surface which inverts an image of an object to be viewed in vertical and horizontal directions.

The pentagonal prism 30 is designed such that angles θ and ψ of the incident surface 30a and the second reflection surface 30b thereof with respect to the exit surface 30d, within a reference plane including the optical axes Ax1 and Ax2 of the objective lens system 10 and the eyepiece system 40 satisfy the following relationships:

$$90° < θ < 120°$$

$$90° < ψ < 120°$$

In the illustrated embodiment, θ=105°, and ψ=101.25°. Thus, the on-axis light incident upon the incident surface 30a of the pentagonal prism 30 at right angles, is emitted from the exit surface 30d along the optical axis Ax2 at right angles (with respect to the exit surface 30d), so that the light can reach a viewer's eye through an eyepiece 41 and a glass cover 42, of the eyepiece system 40.

Figure 3:
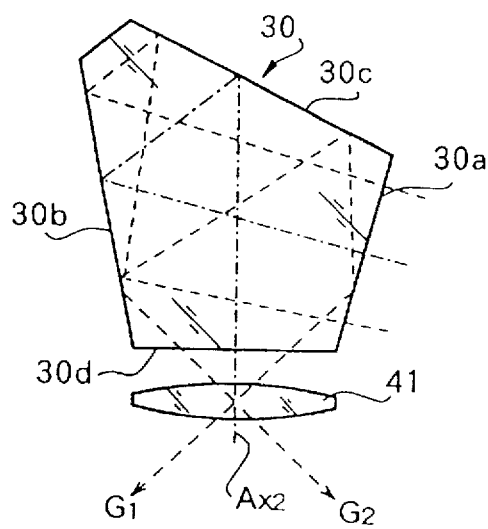
FIG. 3 is an explanatory view showing an optical path of a ghost image which occurs in a pentagonal prism shown in FIG. 1.

When the angles (i.e., θ and ψ) with respect to the exit surface 30d, of the incident surface 30a and the second reflection surface 30b of the pentagonal prism 30 (within the reference plane), are both larger than 90°, as in the first embodiment of the present invention, even if the light reflected by the third reflection surface 30c is reflected by the incident surface 30a or the second reflection surface 30b, so that extraneous rays of light G1 and G2 (ghost images) are produced, the extraneous rays G1 and G2 are emitted from the exit surface 30d in directions far away from the optical axis Ax2 of the eyepiece system 40, as indicated by the broken lines in FIG. 3. Consequently, the extraneous rays G1 and G2 of light transmitted through the eyepiece 41 cannot reach the viewer's eye. Hence, no ghost image can be viewed by the viewer through the view finder.

To miniaturize the pentagonal prism 30 under the condition that the on-axis light is incident upon the incident surface 30a of the pentagonal prism 30 at right angles and is emitted through the exit surface 30d at right angles, the sum (θ+ψ) of the angles θ and ψ, defined between the incident surface 30a and the exit surface 30d and between the second reflection surface 30b and the exit surface 30d within the reference plane, must be within approximately 195° to 210°. One of the angles θ and ψ is determined, with the remaining angle being calculated to satisfy this relationship.

Prevention of the occurrence of the ghost image can be effectively enhanced by increasing both angles θ and ψ to be larger than 90°. In view of the upper limit (i.e., 210°) of the sum value of (θ+ψ), the maximum value of the angle θ or ψ is approximately 120°. If one of the angles θ and ψ is larger than the maximum value (i.e., 120°), in order to make the other angle larger than 90°, the width of the pentagonal prism 30 in the optical axis direction would be too large to realize a compact view finder.

If the angle θ is set to be a large value, the extraneous light (ghost image) produced by the incident surface 30a can be effectively reduced, and if the angle ψ is large, the extraneous light (ghost image) produced by the second reflection surface 30b can be effectively reduced. In the first embodiment, the value of the angle θ is close to the value of the angle ψ, thus the reduction or elimination of the extraneous light produced by the incident surface 30a and the reduction or elimination of the extraneous light produced by the second reflection surface 30b can be well balanced.

If the prism is made of a plastic material, the angles θ, ψ are both preferably larger than 92°. In general, a plastic prism tends to be bent at a periphery thereof due to sagging, and thus the beam of light is considerably more influenced (e.g., deflected) by the curved reflection surface than a curved transmission surface. Accordingly, it is preferable that the effective diameter of the bundle of rays of light be set so as not to impinge on the peripheral portion of the reflection surface to thereby prevent deterioration of the image. When both angles θ, ψ are larger than 92°, the first and second reflection surfaces can be made larger than the effective diameter of the bundle of rays, thereby an adverse influence on the light by the curved reflection surface can be reduced, thus resulting in high image forming efficiency.

According to the first embodiment of the present invention, since light is deflected by the roof prism 20 towards the object side (i.e., away from the viewer), the pentagonal prism 30 can be located closer to the object than in the prior art, so that the distance between the third lens 13 of the objective lens system 10 and the eyepiece 41 in the optical axis direction can be reduced, and thus, the whole length of the view finder is shortened in comparison with the prior art.

Figure 4:
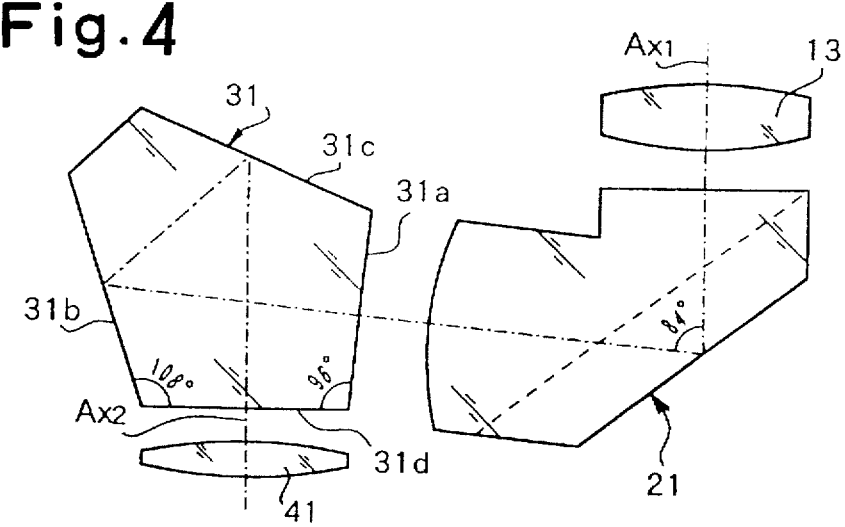
FIG. 4 is a plan view of the main elements of a real image type view finder, according to a second embodiment of the present invention.

FIG. 4 shows a plan view of the main elements of a second embodiment of a real image type view finder in the reference plane similar to FIG. 1, according to the present invention. The second embodiment differs from the first embodiment in that since the shape of the roof prism 21 and the pentagonal prism 31 are different from the first embodiment, the angle defined between the on-axis light incident upon the roof prism 21 and reflected thereby towards the pentagonal prism 31 is different.

In the second embodiment, the angle defined between the on-axis light incident upon the roof prism 21 and the light reflected thereby is 84°. The angles θ and ψ defined between an incident surface 31a of the pentagonal prism 31 and an exit surface 31d, and between a second reflection surface 31b and the exit surface 31d, in the reference plane, are respectively 96° and 108° (θ=96°, ψ=108°). In the second embodiment, the angle ψ is larger than the angle θ, and hence, extraneous light (ghost image) produced by the second reflection surface 31b can be effectively reduced or eliminated.

Figure 5:
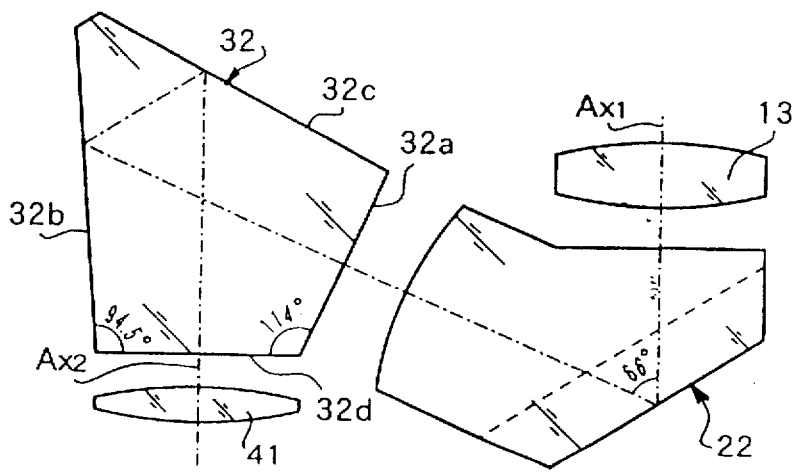
FIG. 5 is a plan view of the main elements of a real image type view finder, according to a third embodiment of the present invention.

FIG. 5 shows a plan view of the main elements of a third embodiment of a real image type view finder in the reference plane similar to FIG. 1, according to the present invention. The third embodiment differs from the first embodiment in that since the shape of the roof prism 22 and the pentagonal prism 32 are different from the first embodiment, the angle defined between the on-axis light incident upon the roof prism 22 and reflected thereby towards the pentagonal prism 32 is different.

In the third embodiment, the angle defined between the on-axis light incident upon the roof prism 22 and the light reflected thereby is 66°. The angles θ and ψ defined between the incident surface 32a of the pentagonal prism 32 and the exit surface 32d, and between the second reflection surface 32b and the exit surface 32d, in the reference plane, are 114° and 94.5°, respectively (θ=114°, ψ=94.5°). In the third embodiment, the angle θ is larger than the angle ψ, and hence, the extraneous light (ghost image) produced by the incident surface 32a can be effectively reduced or eliminated. Moreover, since the reflection angle of the light at the roof prism 22 in the third embodiment is smaller than that in the first and second embodiments, the whole length of the view finder can be more effectively reduced.

Figure 6:
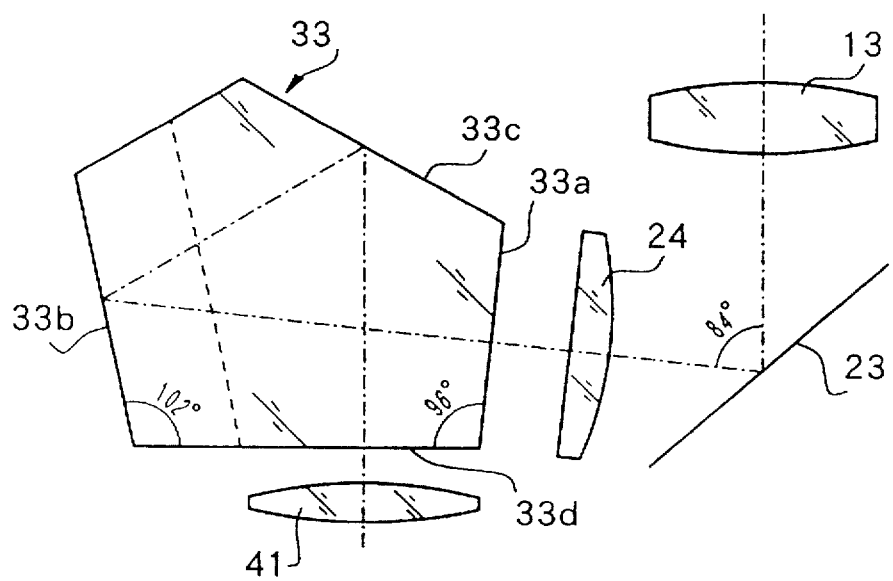
FIG. 6 is a plan view of the main elements of a real image type view finder, according to a fourth embodiment of the present invention.

FIG. 6 shows a plan view of the main elements of a fourth embodiment of a real image type view finder in the reference plane similar to FIG. 1, according to the present invention. In the fourth embodiment, a planar mirror 23 is used as a first deflector having a first reflection surface, and a pentagonal roof prism 33 is used as a second deflector whose roof surface is made of a second reflection surface 33b. A condenser lens 24 is provided between the planar mirror 23 and the pentagonal roof prism 33.

In the fourth embodiment, the angle defined between the on-axis light incident upon the planar mirror 23 and the light reflected thereby is 84°. The angles θ and ψ defined between the incident surface 33a of the pentagonal roof prism 33 and the exit surface 33d, and between the second reflection surface 33b and the exit surface 33d, in the reference plane, are 96° and 102°, respectively (θ=96°, ψ=102°). In the fourth embodiment, the refractive index of the pentagonal roof prism 33, which constitutes the second deflector, is preferably more than 1.7. In the case, as in the fourth embodiment, that the roof surface is provided on the second deflector, the pentagonal prism becomes larger than that in the previous embodiments. If the refractive index of the pentagonal prism were identical to that in the previous embodiments, the optical distance, in terms of spatial distance, would be longer in the fourth embodiment than in the first, second and third embodiments.

Since the image is formed, by the objective lens system, at a position in the vicinity of the incident surface of the pentagonal roof prism 33, if the optical distance is large, the distance between the image forming surface of the objective lens system and the eyepiece 41 becomes large, and hence, the focal length of the eyepiece must be increased. This results in a narrow apparent field of view.

To solve this, in the fourth embodiment, the refractive index of the pentagonal roof prism 33 is set to be a large value, that is, the pentagonal roof prism 33 is made of a glass material having a high refractive index. Consequently, the increase in the optical distance (spatial distance) caused by the large pentagonal roof prism can be nullified. As a result, it is possible to obtain a wide apparent field of view without increasing the focal length of the eyepiece 41.

Figure 7:
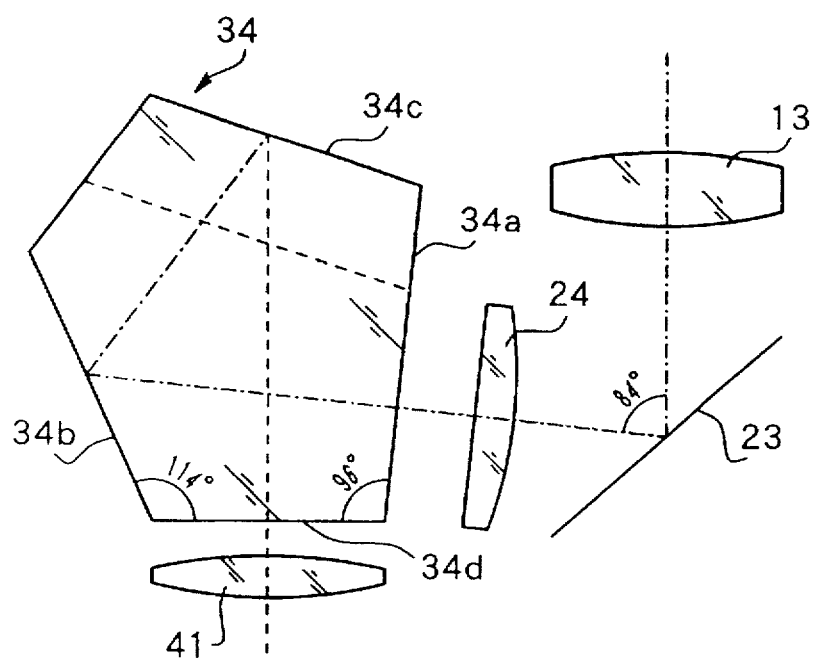
FIG. 7 is a plan view of the main elements of a real image type view finder, according to a fifth embodiment of the present invention.

FIG. 7 shows a plan view of the main elements of a fifth embodiment of a real image type view finder in the reference plane similar to FIG. 6, according to the present invention. In the fifth embodiment, the planar mirror 23 is used as a first deflector, and a pentagonal roof prism 34 is used as a second deflector whose roof surface is made of a third reflection surface 34c.

In the fifth embodiment, the angle defined between the on-axis light incident upon the planar mirror 23 and the light reflected thereby is 84°, similar to the fourth embodiment. The angles θ and ψ defined between the incident surface 34a of the pentagonal roof prism 34 and the exit surface 34d, and between the second reflection surface 34b and the exit surface 34d, in the reference plane, are 96° and 114°, respectively (θ=96°, ψ=114°). In the fifth embodiment, the refractive index of the pentagonal roof prism 34 is set to be more than 1.7, in view of the increase in the size of the pentagonal roof prism 34 having the roof surface, similar to the fourth embodiment. In the fifth embodiment, since the roof surface is defined by the third reflection surface 34c, the length of the pentagonal roof prism 34 in the optical axis direction is increased, but the lateral width thereof can be reduced in comparison with the fourth embodiment. Consequently, the angle ψ defined by the second reflection surface 34b and the exit surface 34d can be made larger than that in the fourth embodiment. Thus, the extraneous light produced by the second reflection surface 34b can be effectively reduced or eliminated.

In the fourth embodiment, since the roof surface is defined by the second reflection surface 33b of the pentagonal roof prism, the lateral width thereof is larger than that of the fifth embodiment. To reduce the lateral width of the pentagonal roof prism, the angle ψ is set to be smaller in the fourth embodiment than the angle ψ in the fifth embodiment.

Figure 8:
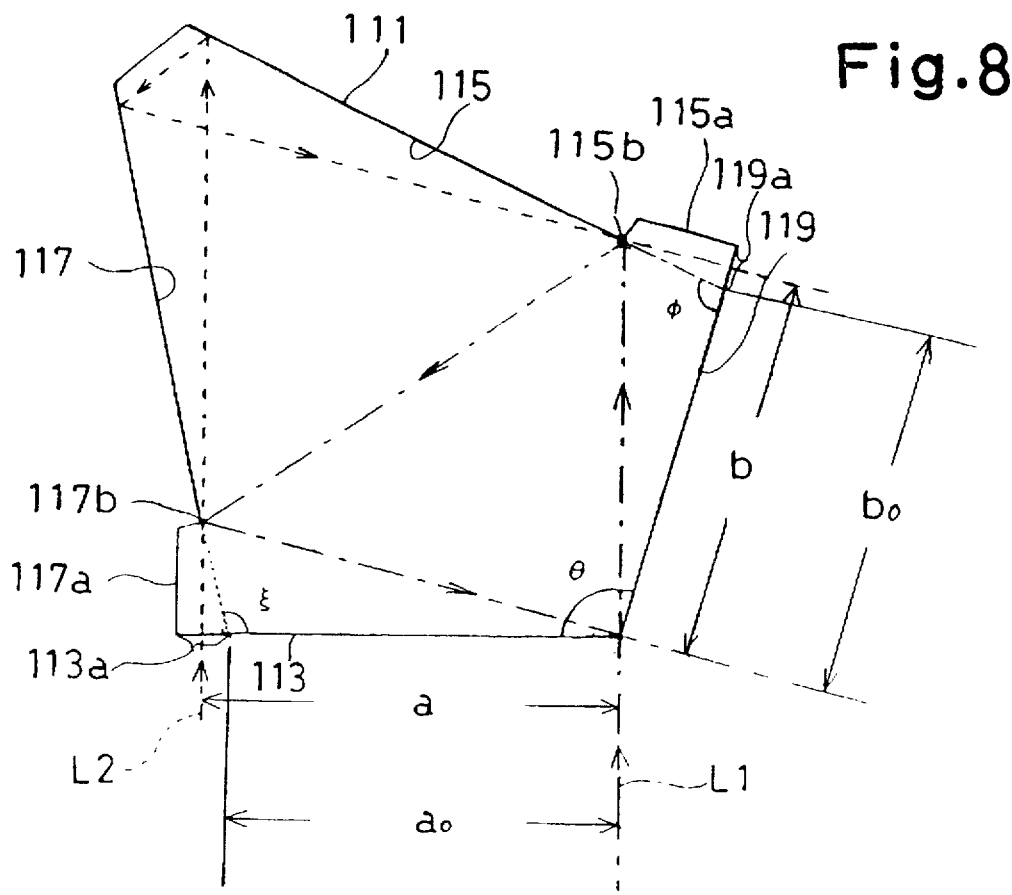
FIG. 8 is a schematic view of a pentagonal prism to which the present invention is applied, by way of example.
Figure 11:
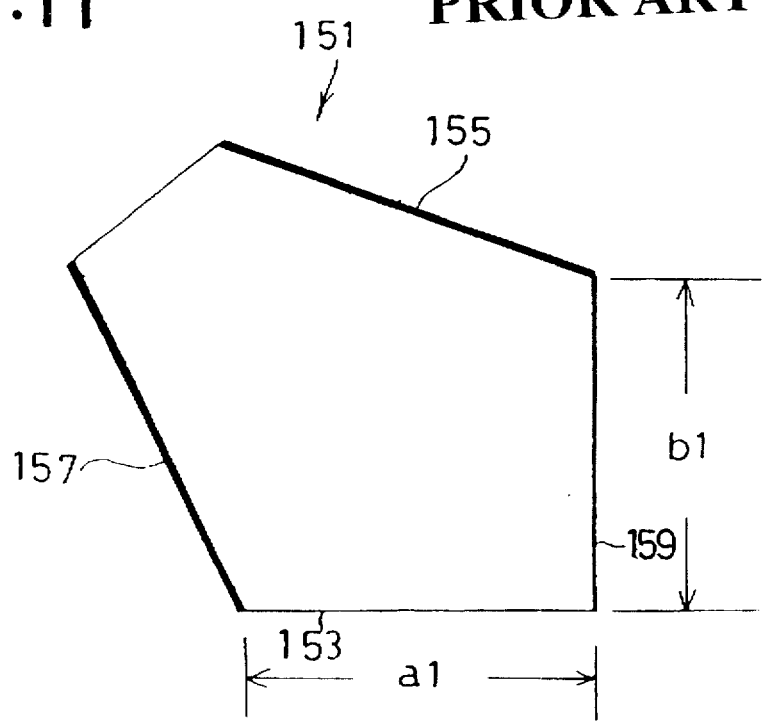
Figure 9:
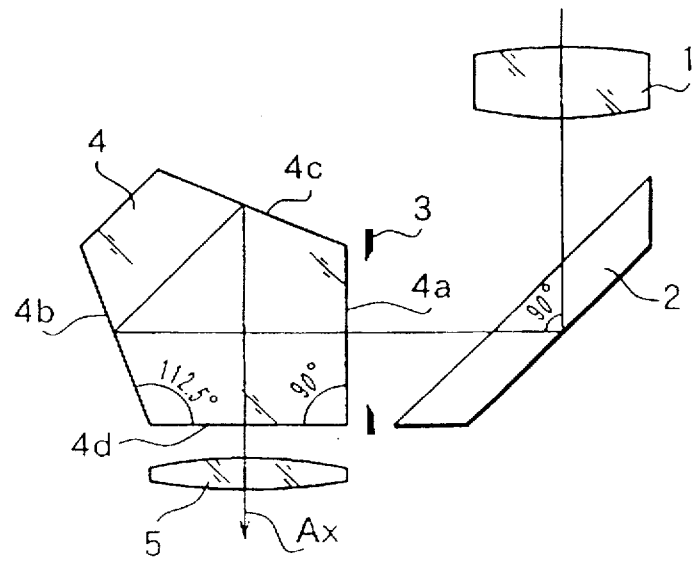
FIG. 9 is a plan view of an optical system of a known real image type view finder.
Figure 10:
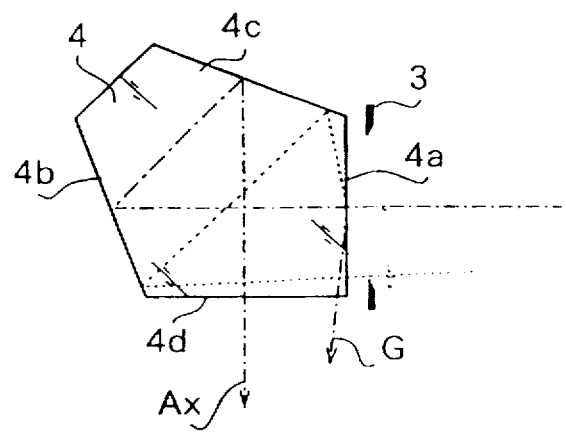
FIG. 10 is an explanatory view showing an optical path for a ghost image produced in a pentagonal prism shown in FIG. 9; and, FIG. 11 is a schematic view of a known pentagonal prism.

FIG. 8 shows an example of a pentagonal prism 111 according to an aspect of the present invention. The pentagonal prism 111 is made of a glass material, and comprises first and second transmission surfaces 113 and 119, and first and second reflection surfaces 115 and 117. Light incident upon the first transmission surface 113 is reflected by the first and second reflection surfaces 115 and 117 and is then emitted through the second transmission surface 119. Note that the pentagonal prism 111 may be made of an optical plastic material instead of a glass material.

The first reflection surface 115 is provided with a projection 115a which projects outwardly at the connection to the second transmission surface 119. The second reflection surface 117 is provided with a projection 117a which projects outwardly at the connection to the first transmission surface 113. The projections 117a and 115a extend along the entire edge width of the first and second transmission surfaces 113 and 119, respectively.

The projections 117a and 115a provide respective extensions 113a and 119a of the first and second transmission surfaces 113 and 119. Namely, the effective widths of the first and second transmission surfaces 113 and 119 are extended from "a0" and "b0" to "a" and "b", respectively, wherein "a0" and "b0" represent the effective widths of the first and second transmission surfaces 113 and 119 in the absence of the projections 115a and 117a. Namely, a>a0 and b>b0.

As can be seen from the foregoing, in the embodiment illustrated in FIG. 8, the effective widths of the first and second transmission surfaces 113 and 119 are increased without actually making the pentagonal prism large. Thus, a bundle of rays of light having a larger diameter can pass through the pentagonal prism.

Moreover, in the embodiment shown in FIG. 8, the angle θ defined between the first and second transmission surfaces 113 and 119 adjacent to each other is larger than 90° (θ>90°); the angle ψ defined between the first transmission surface 113 and the second reflection surface 117 adjacent to each other is larger than 90° (ψ>90°); and, the angle φ defined between the second transmission surface 119 and the first reflection surface 115 adjacent to each other is larger than 90° (φ>90°). Consequently, the effective widths of the first and second transmission surfaces 113 and 119 can be increased in comparison with a pentagonal prism in which the angle θ is 90° (θ=90°).

Since the angles θ and ψ are larger than 90°, the ghost image can be restricted or eliminated. Note that the angles θ and φ cannot be larger than 120°.

In the embodiment illustrated in FIG. 8, the positions of the edges 115b and 117b of the projections 115a and 117a at the first and second reflection surfaces 115 and 117 are determined in accordance with a ray of light L1 which is made incident upon the first transmission surface 113 at the connection to the second transmission surface 119 and emitted from the second transmission surface 119 at the end edge thereof, and the ray of light L2 which is made incident upon the first transmission surface 113 at the position near the end edge thereof, close to the second reflection surface 117, and emitted from the second transmission surface 119 at the vicinity of the end edge thereof close to the first reflection surface 115, respectively.

As can be seen from the foregoing, since the reflection surfaces are provided, on the ends thereof close to the adjacent transmission surfaces, with projections that provide extensions of the associated transmission surfaces, the effective widths of the transmission surfaces can be increased.

As can be understood from the above discussion, according to the present invention, since the angles defined between the incident surface of the prism (second deflector) and the exit surface thereof, and between the second reflection surface of the prism and the exit surface thereof, are set to be larger than 90°, the extraneous rays of light (ghost images) produced by the incident surface and the second reflection surface can be largely deflected away from the optical axis of the prism. Consequently, it is possible to prevent the extraneous light (ghost image) from reaching the viewer's eye without making the prism large. Thus, no ghost image in the finder can be viewed by the viewer.

What is claimed is:

1. An optical system for a real image type view finder having an objective lens system and an ocular lens system, comprising:

a first deflector having a first reflection surface to reflect on-axis light, incident thereupon along an optical axis of said objective lens system, towards an optical axis of said ocular lens system; and a second deflector having an incident surface upon which said on-axis light reflected by said first deflector is made incident, and second and third reflection surfaces to internally reflect said light incident upon said incident surface, before emitting said light through an exit surface towards said ocular lens system, wherein, said on-axis light incident upon said first deflector and said light reflected by said first deflector defines an acute angle therebetween, and said second deflector satisfies the following relationships:

$$90°<\theta<120°$$
   $$90°<\psi<120°$$

wherein "θ" represents an angle defined between said incident surface and said exit surface of said second deflector, and "ψ" represents an angle defined between said second reflection surface and said exit surface of said second deflector, said incident surface of said second deflector being perpendicular to said on-axis light incident upon said second deflector, said exit surface being perpendicular to said optical axis of said ocular lens system.

2. The optical system for a real image type view finder according to claim 1, wherein said angle defined between said incident surface and said exit surface of said second deflector is greater than said angle defined between said second reflection surface and said exit surface of said second deflector.

3. The optical system for a real image type view finder according to claim 1, wherein said angle defined between said second reflection surface and said exit surface of said second deflector is greater than said angle defined between said incident surface and said exit surface of said second deflector.

4. The optical system for a real image type view finder according to claim 1, wherein said first deflector comprises a roof prism having a first reflection surface formed by a roof surface to invert an object image in a vertical direction and a horizontal direction.

5. The optical system for a real image type view finder according to claim 1, wherein said first deflector comprises a roof mirror having a first reflection surface formed by a roof surface to invert an object image in a vertical direction and a horizontal direction.

6. The optical system for a real image type view finder according to claim 4, wherein said second deflector is a pentagonal prism.

7. The optical system for a real image type view finder according to claim 5, wherein said second deflector is a pentagonal prism.

8. The optical system for a real image type view finder according to claim 1, wherein said second deflector is a pentagonal roof prism, one of said second reflection surface and said third reflection surface comprising a roof surface which inverts an object image in a vertical direction and a horizontal direction.

9. The optical system for a real image type view finder according to claim 8, wherein said prism has a refractive index of at least 1.7.

10. The optical system for a real image type view finder according to claim 1, wherein said optical axis of said ocular lens system is parallel to and spaced a predetermined distance from said optical axis of said objective lens system.

11. A prism, comprising:

a first transmission surface through which a light is made incident;

a second transmission surface adjacent to said first transmission surface through which said light exits;

a first reflection surface adjacent to said second transmission surface; and a second reflection surface adjacent to said first transmission surface, wherein said first reflection surface and said second reflection surface are provided, on portions thereof contiguous to said second transmission surface and said first transmission surface, with projections which respectively extend said second transmission surface and said first transmission surface, wherein the following relationships are satisfied:

$$\theta > 90°$$
   $$\psi > 90°$$
   $$\phi > 90°$$

wherein "θ" defines an angle formed between said first transmission surface and said second transmission surface, "ψ" defines an angle formed between said first transmission surface and said second reflection surface, and "φ" defines an angle formed between said second transmission surface and said first reflection surface.

12. The prism according to claim 11, wherein said prism is a pentagonal prism.

13. An optical system for a real image type view finder, comprising:

an objective lens system;

an ocular lens system; and a deflector having an incident surface upon which light passing through said objective lens system is made incident, and a first reflection surface and a second reflection surface which internally reflect said incident light, before said incident light is emitted through an exit surface of said deflector towards said ocular lens system, wherein said deflector satisfies the following relationships:

$$90°<\theta<120°$$
   $$90°<\psi<120°$$

wherein "θ" represents an angle defined between said incident surface and said exit surface of said deflector, and "ψ" represents an angle defined between said first reflection surface and said exit surface of said deflector, said incident surface of said deflector being perpendicular to an on-axis light incident upon said deflector, said exit surface being perpendicular to said optical axis of said ocular lens system.

14. The prism of claim 11, wherein said projections extend widths of said first transmission surface and said second transmission surface.